United States Patent
Teggatz et al.

(10) Patent No.: US 10,250,081 B2
(45) Date of Patent: *Apr. 2, 2019

(54) METHOD AND SYSTEM OF WIRELESS POWER TRANSFER FOREIGN OBJECT DETECTION

(71) Applicant: Triune Systems, LLC, Plano, TX (US)

(72) Inventors: Ross E. Teggatz, The Colony, TX (US); Amer Atrash, Dallas, TX (US); Wayne Chen, Plano, TX (US); Jonathan Knight, Yokosuka (JP)

(73) Assignee: TRIUNE SYSTEMS, LLC, Plano, TX (US)

( * ) Notice: Subject to any disclaimer, the term of this patent is extended or adjusted under 35 U.S.C. 154(b) by 150 days.

This patent is subject to a terminal disclaimer.

(21) Appl. No.: 15/237,288

(22) Filed: Aug. 15, 2016

(65) Prior Publication Data

US 2017/0012478 A1 Jan. 12, 2017

Related U.S. Application Data

(63) Continuation of application No. 13/743,765, filed on Jan. 17, 2013, now Pat. No. 9,417,199.

(Continued)

(51) Int. Cl.
*H02J 50/60* (2016.01)
*H02J 50/12* (2016.01)
*H02J 50/40* (2016.01)
*H02J 7/02* (2016.01)
*H02J 7/04* (2006.01)
*G01V 3/10* (2006.01)

(52) U.S. Cl.
CPC ............. *H02J 50/60* (2016.02); *G01V 3/10* (2013.01); *H02J 7/025* (2013.01); *H02J 7/047* (2013.01); *H02J 50/12* (2016.02); *H02J 50/40* (2016.02)

(58) Field of Classification Search
CPC .. H02J 50/60; H02J 50/40; H02J 50/12; H02J 7/047; H02J 7/025; G01V 3/10; G01N 27/02
See application file for complete search history.

(56) References Cited

U.S. PATENT DOCUMENTS

| 3,956,618 A | 5/1976 | Gotz |
| 4,142,187 A | 2/1979 | Nakayama |

(Continued)

FOREIGN PATENT DOCUMENTS

| EP | 2591535 A2 | 5/2013 |
| WO | 2015/195403 A2 | 12/2015 |

(Continued)

*Primary Examiner* — Son Le
*Assistant Examiner* — Akm Zakaria
(74) *Attorney, Agent, or Firm* — Jackson Walker LLP; Christopher J. Rourk

(57) ABSTRACT

A wireless power transfer foreign object detector having, at least one secondary receiver coil, an adjustable load electrically coupled to the at least one secondary receiver coil, and at least one temperature sensor providing at least one temperature detection signal, wherein the at least one temperature sensor responsive to at least one thermal state of the at least one secondary receiver coil, and wherein foreign object detection is based at least in part upon the at least one temperature detection signal.

20 Claims, 20 Drawing Sheets

Related U.S. Application Data

(60) Provisional application No. 61/587,148, filed on Jan. 17, 2012.

(56) References Cited

U.S. PATENT DOCUMENTS

| | | |
|---|---|---|
| 7,808,127 B2 | 10/2010 | Teggatz et al. |
| 7,827,334 B2 | 11/2010 | Teggatz et al. |
| 7,859,911 B2 | 12/2010 | Teggatz et al. |
| 7,982,492 B2 | 7/2011 | Atrash et al. |
| 8,102,713 B2 | 1/2012 | Teggatz et al. |
| 8,102,718 B2 | 1/2012 | Teggatz et al. |
| 8,300,375 B2 | 10/2012 | Teggatz et al. |
| 8,373,436 B2 | 2/2013 | Atrash et al. |
| 8,408,900 B2 | 4/2013 | Teggatz et al. |
| 8,441,866 B2 | 5/2013 | Teggatz et al. |
| 8,461,847 B2 | 6/2013 | Teggatz et al. |
| 8,552,336 B2 | 10/2013 | Blackall et al. |
| 8,583,037 B2 | 11/2013 | Atrash et al. |
| 8,584,961 B2 | 11/2013 | Teggatz et al. |
| 8,664,745 B2 | 3/2014 | Teggatz et al. |
| 8,687,385 B2 | 4/2014 | Teggatz et al. |
| 8,693,261 B2 | 4/2014 | Teggatz et al. |
| 8,704,450 B2 | 4/2014 | Chen et al. |
| 8,743,522 B2 | 6/2014 | Teggatz et al. |
| 8,768,455 B2 | 7/2014 | Teggatz et al. |
| 8,896,318 B2 | 11/2014 | Teggatz et al. |
| 8,964,418 B2 | 2/2015 | Atrash et al. |
| 9,083,391 B2 | 7/2015 | Teggatz et al. |
| 9,089,029 B2 | 7/2015 | Teggatz et al. |
| 9,106,221 B2 | 8/2015 | Atrash et al. |
| 9,134,741 B2 | 9/2015 | Atrash et al. |
| 9,214,867 B2 | 12/2015 | Teggatz et al. |
| 9,225,199 B2 | 12/2015 | Teggatz et al. |
| 9,225,293 B2 | 12/2015 | Teggatz et al. |
| 9,231,400 B2 | 1/2016 | Chen et al. |
| 9,343,988 B2 | 5/2016 | Teggatz et al. |
| 9,354,268 B2 | 5/2016 | Teggatz et al. |
| 9,503,178 B2 * | 11/2016 | Lee .................. H02J 17/00 |
| 2008/0030340 A1 | 2/2008 | Rofougaran |
| 2009/0278523 A1 | 11/2009 | Yoda et al. |
| 2009/0278651 A1 | 11/2009 | Okada et al. |
| 2009/0284341 A1 | 11/2009 | Okada et al. |
| 2010/0207611 A1 | 8/2010 | Thoss et al. |
| 2010/0277003 A1 | 11/2010 | Von Novak et al. |
| 2011/0008527 A1 | 1/2011 | Teggatz et al. |
| 2011/0181240 A1 | 7/2011 | Baarman et al. |
| 2012/0025752 A1 | 2/2012 | Teggatz et al. |
| 2012/0028845 A1 | 2/2012 | Teggatz et al. |
| 2012/0139357 A1 | 6/2012 | Teggatz et al. |
| 2012/0139358 A1 | 6/2012 | Teggatz et al. |
| 2012/0175967 A1 | 7/2012 | Dibben et al. |
| 2012/0188673 A1 | 7/2012 | Teggatz et al. |
| 2012/0248893 A1 | 10/2012 | Teggatz et al. |
| 2012/0248981 A1 | 10/2012 | Karalis et al. |
| 2012/0256494 A1 | 10/2012 | Kesler et al. |
| 2012/0274838 A1 | 11/2012 | Teggatz et al. |
| 2012/0326521 A1 | 12/2012 | Bauer et al. |
| 2012/0326524 A1 | 12/2012 | Matsumoto et al. |
| 2012/0326662 A1 * | 12/2012 | Matsumoto .......... H02J 7/025 320/108 |
| 2013/0009650 A1 | 1/2013 | Sakakibara et al. |
| 2013/0026366 A1 | 1/2013 | Quad et al. |
| 2013/0057300 A1 | 3/2013 | Bernard et al. |
| 2013/0062967 A1 | 3/2013 | Teggatz et al. |
| 2013/0119925 A1 | 5/2013 | Kawamura |
| 2013/0175982 A1 | 7/2013 | Teggatz et al. |
| 2013/0181724 A1 | 7/2013 | Teggatz et al. |
| 2013/0193771 A1 | 8/2013 | Teggatz |
| 2013/0224679 A1 | 8/2013 | Teggatz et al. |
| 2013/0241465 A1 | 9/2013 | Teggatz et al. |
| 2013/0241745 A1 | 9/2013 | Colvin et al. |
| 2013/0257171 A1 | 10/2013 | Teggatz et al. |
| 2013/0257172 A1 | 10/2013 | Teggatz et al. |
| 2014/0057366 A1 | 2/2014 | Dittmer et al. |
| 2014/0062381 A1 | 3/2014 | Teggatz et al. |
| 2014/0225447 A1 | 8/2014 | Teggatz |
| 2014/0329720 A1 | 11/2014 | Teggatz et al. |
| 2015/0171758 A1 | 6/2015 | Atrash et al. |
| 2015/0256227 A1 | 9/2015 | Teggatz et al. |
| 2015/0318899 A1 | 11/2015 | Teggatz et al. |
| 2015/0326118 A1 | 11/2015 | Teggatz et al. |
| 2015/0341087 A1 | 11/2015 | Moore et al. |
| 2015/0372676 A1 | 12/2015 | Teggatz et al. |
| 2016/0004267 A1 | 1/2016 | Atrash et al. |
| 2016/0033979 A1 | 2/2016 | Teggatz et al. |
| 2016/0105115 A1 | 4/2016 | Teggatz et al. |
| 2016/0134099 A1 | 5/2016 | Teggatz et al. |
| 2016/0134191 A1 | 5/2016 | Teggatz et al. |

FOREIGN PATENT DOCUMENTS

| | | |
|---|---|---|
| WO | 2016/019137 A2 | 2/2016 |
| WO | 2016/019139 A1 | 2/2016 |

* cited by examiner

METHOD AND SYSTEM OF WIRELESS POWER TRANSFER FOREIGN OBJECT DETECTION

PRIORITY ENTITLEMENT

This application is a continuation patent application of Ser. No. 13/743,765 filed Jan. 17, 2013, patented under U.S. Pat. No. 9,417,199 on Aug. 16, 2016, which is entitled to priority based on from Provisional Application Ser. No. 61/587,148 filed on Jan. 17, 2012, which are incorporated herein by this reference. These applications and the Provisional Patent Application have at least one common inventor.

TECHNICAL FIELD

The disclosure relates to wireless power transfer systems. More particularly, the disclosure relates to foreign object detection in wireless power and data transfer applications. The disclosure relates to the more efficient transfer of energy.

BACKGROUND

Power transfer is intended to occur between a transmitting device and a receiving device. Foreign objects receiving a portion of this transmitted energy decrease system efficiency. These foreign objects may provide a path which generates eddy currents causing electrically induced thermal dissipation. During wireless power transfer, ohmic losses may be incurred in addition to magnetic field losses thereby increasing the difficulty in determining whether the transmitting device is communicating solely with the receiving device or the receiving device in addition to a foreign object. Variations in placement of the primary transmitter coil and the secondary receiver coil may decrease the efficiency of the magnetic field coupling, and thus system efficiency. Thus, the foregoing may increase the general difficulty in determining whether a system is transferring electrical energy to dissipating foreign objects. Due to these and other problems and potential problems, improved detection of foreign objects would be useful and advantageous contributions to the arts.

SUMMARY

In carrying out the principles of the present disclosure, the device and method provides advances in the arts with apparatus and method directed to the transfer of power and/or data utilizing foreign object detection. In other examples, systems and methods include capabilities for power and/or data transfer.

According to aspects of the disclosure, examples include detuning and monitoring, changing load impedance and monitoring, use of satellite coils to determine primary transmitter coil to secondary receiver coil coupling placement and monitoring, use of the primary transmitter and secondary receiver coils as capacitors to determine coupling and monitoring, driving to and/or from primary transmitter coils to secondary receiver coils and monitoring, or any combination of these. Monitoring may comprise measurement of temperatures, current ramp rates, voltage ramp rates, capacitance and the like, before, during and/or after testing.

A solution to the magnetic field loss from foreign objects can be provided. Foreign metallic objects provide a path where eddy currents can be generated thereby causing heating in these objects and reducing the efficiency of power transfer. During wireless power transfer, ohmic as well as magnetic field losses may occur which make determination of whether a transmitter is communicating with a receiving device or a receiving device along with a foreign object difficult. In addition, indirect placement of the primary transmitter coil and secondary receiver coils may cause the efficiency of the magnetic field coupling to vary.

Several methods and systems to determine whether a foreign object is interfering with power transfer are envisioned in the following disclosure. The methods and systems comprise at least detuning and monitoring, changing load impedance and monitoring, use of satellite coils to determine primary transmitter to secondary receiver coil coupling placement and monitoring, the use of the primary transmitter to secondary receiver coils as capacitors to determine coupling and monitoring, driving a power signal from primary transmitter coil to secondary receiver coil and then from secondary receiver coil to primary transmitter coil and monitoring, or combinations of any of these implementations.

In order to determine whether a foreign object is present, once a stable temperature is attained, the secondary receiver coil is detuned by adjusting the complex load from the resonant frequency. After a certain period of time in the detuned mode, the temperature is again measured. If there is no significant delta in the measured temperatures, then a foreign object is likely present. The system can then reduce the transmitted power to the primary transmitter coil by a reduction of amplitude or similar methods to prevent overheating, a failure or the like.

One way of determining whether a foreign object is located within the vicinity of the power transferring magnetic field is by varying the load on the secondary receiver coil while either changing or keeping the primary transmitter coil power constant and measuring delta temperatures.

Smaller satellite coils may be placed around either the primary transmitter coil and/or secondary receiver coil power coil. These coils may then be coupled to the respective secondary receiver coil and/or primary transmitter coil. The coupling coefficient between the satellite coils may be measured. If the satellite coils have equal coupling coefficients then the secondary receiver coil and primary transmitter coil are substantially aligned. If a substantial deviation of the coupling coefficient is measured between the satellite coils the secondary receiver coil and primary transmitter coils are substantially offset. The magnitude of the offset can be empirically determined by the magnitude of the difference between the measured coupling coefficients of the satellite coils. The coupling coefficients between the primary transmitter coil and the secondary receiver coil are related to the power transfer from the primary transmitter coil to the secondary receiver coil. Therefore, if during a power transmission from the primary transmitter coil to the secondary receiver coil, the coupling coefficient, the power to the load, and the temperature delta are measured, a determination may be made as to whether a foreign object impedes the power transfer. This determination enables subsequent actions such as reduction or termination of power transmission and signaling a fault flag and the like.

The secondary receiver coil and primary transmitter coil, during startup or at any point in a power transmission, may be placed into a constant voltage state on each side of the resonant circuits. These constant voltages can then be varied and the capacitive coupling can be determined. If capacitive coupling is maximized, the primary transmitter coil and secondary receiver coil are substantially aligned. Satellite coils can be used to measure satellite capacitance. By measuring the capacitance values of the various coils, the coupling coefficients between secondary receiver coil and primary transmitter coil may be determined.

Transmission of a known power from a secondary receiver coil to a primary transmitter coil while measuring power transfer and temperature rise can be used to determine whether a foreign object is in the vicinity of the magnetic coupled coils. Both transmissions from primary transmitter coil to secondary receiver coil and from secondary receiver coil to primary transmitter coil can be performed and while measuring power transfer and temperature deltas. A foreign object may be near the secondary receiver coil side, if a higher temperature is measured at the secondary receiver coil during power transfer from a primary transmitter coil to secondary receiver coil. If a foreign object is located near the primary transmitter coil, a higher temperature may be measured near the primary transmitter coil when power is transmitted from the secondary receiver coil to the primary transmitter coil.

An inner coil and an outer coil may be used to transmit energy. These inner and outer coils may be used individually or in combination to transmit power, while the magnetic field at the secondary receiver coil and the delta temperature are measured. The inner and outer coils may need their resonance to be adjusted by tuning the series capacitance of the resonant circuitry.

A mobile shield may be implemented around the primary transmitter coil and secondary receiver coil. The mobile shield may act to inhibit the magnetic field from propagating to foreign objects. This can be done mechanically by physically moving a ferrite bearing material or by using a mobile ferrite such as Sendust (an magnetic metal powder that is 85% iron, 9% silicon and 6% aluminum which has a high magnetic permeability and high saturation flux density), ferrite filings and the like and utilize other fields to move the mobile ferrites away from the primary transmitter coil and secondary receiver coil. At least one characteristic of these mobile ferrites may also be measured to determine whether there is an obstruction in the field lines which would indicate a foreign object. These monitoring methods can be utilized in any combination to determine whether a foreign object is in the vicinity of the magnetically coupled circuit.

An example and it's aspect of a wireless power transfer foreign object detector comprising at least one secondary receiver coil and an adjustable load electrically coupled to the at least one secondary receiver coil. The system further comprises at least one temperature sensor providing at least one temperature detection signal, the at least one temperature sensor responsive to at least one thermal state of the at least one secondary receiver coil, and wherein foreign object detection is based at least in part upon the at least one temperature detection signal.

Another example of a method of wireless power transfer foreign object detection comprises the steps of measuring at least one tuned temperature state of at least one secondary receiver coil and detuning an adjustable load of the at least one secondary receiver coil from at least one resonant frequency. The method further comprises the steps of measuring at least one detuned temperature state of the at least one secondary receiver coil and determining at least one foreign object based at least in part upon the at least one tuned temperature state and the at least one detuned temperature state.

An alternate example of a wireless power transfer foreign object detector comprising at least one primary transmitter coil and at least one secondary receiver coil responsive to the at least one primary transmitter coil. The system further comprises an adjustable complex load electrically coupled to the at least one secondary receiver coil, and at least one temperature sensor responsive to at least one thermal state of the at least one secondary receiver coil, wherein foreign object detection is based at least in part upon the at least one thermal state of the at least one secondary receiver coil.

A further example of a wireless power transfer foreign object detector comprising at least one primary transmitter coil and a plurality of satellite transmitter coils adjacent to the at least one primary transmitter coil where foreign object detection is based at least in part upon at least one characteristic of an electrical coupling of at least two of the plurality of satellite transmitter coils.

Yet another example of a wireless power transfer foreign object detector comprising at least one secondary receiver coil and a plurality of satellite receiver coils adjacent to the at least one secondary receiver coil wherein foreign object detection is based at least in part upon at least one characteristic of an electrical coupling of at least two of the plurality of satellite receiver coils.

Yet a further example of a method of wireless power transfer foreign object detection comprises the steps of measuring at least one characteristic of an electrical coupling between at least one primary transmitter coil and at least one satellite transmitter coil and measuring at least one characteristic of an electrical coupling between the at least one primary transmitter coil and at least one secondary receiver coil. The method further comprises the step of determining at least one foreign object based at least in part upon the measured at least one characteristic of the electrical coupling between the at least one primary transmitter coil and the at least one satellite transmitter coil and between the at least one primary transmitter coil and the at least one secondary receiver coil.

Another example of a method of wireless power transfer foreign object detection comprises the steps of setting at least one primary transmitter coil to a primary transmitter voltage state and setting at least one secondary receiver coil to a secondary receiver voltage state. The method further comprises the step of measuring a capacitive coupling between the at least one primary transmitter coil and the at least one secondary receiver coil and determining at least one foreign object based at least in part upon the measured capacitive coupling between the at least one primary transmitter coil and the at least one secondary receiver coil.

Yet a further example of a method of wireless power transfer foreign object detection comprises the steps of setting at least one receiver power transmitted from at least one secondary receiver coil, measuring at least one receiver temperature state of the at least one secondary receiver coil and determining at least one foreign object based at least in part upon at least one of the measured at least one receiver temperature state.

Still another example of a wireless power transfer foreign object detector comprises at least one inner primary transmitter coil and at least one outer primary transmitter coil where the outer primary transmitter coil is adjacent to the at least one inner primary transmitter coil. The system further comprises at least one temperature sensor providing at least one transmitter temperature detection signal, the at least one temperature sensor is responsive to at least one thermal state of the at least one inner primary transmitter coil and at least one outer primary transmitter coil. Foreign object detection in this example is based at least in part upon the at least one transmitter temperature detection signal.

Another example of a wireless power transfer foreign object detector comprises at least one inner secondary receiver coil and at least one outer secondary receiver coil. The outer secondary receiver coil is adjacent to the at least one secondary receiver coil. At least one temperature sensor provides at least one receiver temperature detection signal. The at least one temperature sensor is responsive to at least one thermal state of the at least one inner secondary receiver coil and at least one outer secondary receiver coil. Foreign object detection is based at least in part upon the at least one receiver temperature detection signal.

Yet another alternate example of a wireless power transfer foreign object detector comprises a plurality of mobile ferrites and at least one optical detector optically responsive to the plurality of mobile ferrites. The at least one optical detector provides an optical detection signal wherein foreign object detection is based at least in part upon the optical detection signal.

A further example of a wireless power transfer foreign object detector comprises multiple mobile ferrites, wherein at least one magnetic detector is responsive to the mobile ferrites. The at least one magnetic detector provides a magnetic detection signal wherein foreign object detection is based at least in part upon the magnetic detection signal and at least one mobile ferrite sweeper locationally directing at least one of said plurality of mobile ferrites based at least in part upon said foreign object detection signal.

The disclosure has advantages which are not limited to one or more of, improved coupled inductor system power transfer and improved data transmission functionality. These and other potential advantageous, features, and benefits of the present disclosure can be understood by one skilled in the arts upon careful consideration of the detailed description of representative examples of the disclosure in connection with the accompanying drawings.

BRIEF DESCRIPTION OF THE DRAWINGS

The present disclosure will be more clearly understood from consideration of the following detailed description and drawings in which.

References in the detailed description correspond to like references in the various drawings unless otherwise noted. Descriptive and directional terms used in the written description such as right, left, back, top, bottom, upper, side, et cetera, refer to the drawings themselves as laid out on the paper and not to physical limitations of the disclosure unless specifically noted. The drawings are not to scale, and some features of examples shown and discussed are simplified or amplified for illustrating principles and features as well as advantages of the disclosure.

DETAILED DESCRIPTION OF THE DISCLOSURE

The features and other details of the disclosure will now be more particularly described with reference to the accompanying drawings, in which various illustrative examples of the disclosed subject matter are shown and/or described. It will be understood that particular examples described herein are shown by way of illustration and not as limitations of the disclosure. The disclosed subject matter should not be construed a limited to any examples set forth herein. These examples are provided so that this disclosure will be thorough and complete, and will fully convey the scope of the disclosed subject matter to those skilled in the art. The principle features of this disclosure can be employed in various examples without departing from the scope of the disclosure. Patent applications and patents reference herein are incorporated by reference.

The terminology used herein is for the purpose of describing particular examples and is not intended to be limiting of the disclosed subject matter. Like number refer to like elements throughout. As used herein the term "and/or" includes any and all combinations of one or more of the associated listed items. Also, as used herein, the singular forms "a", "an", and "the" are intended to include the plural forms as well, unless the context clearly indicates otherwise. It will be further understood that the terms "comprises", and/or "comprising" when used in this specification, specify the presence of stated features, integers, steps, operations, elements, and/or components, and do not preclude the presence or addition of one or more other features, integers, steps, operations, elements, components, and/or groups thereof. Also, as used herein, relational terms such as first and second, top and bottom, left and right, and the like may be used solely to distinguish one entity or action from another entity or action without necessarily requiring or implying any actual such relationship or order between such entities or actions.

Figure 1:
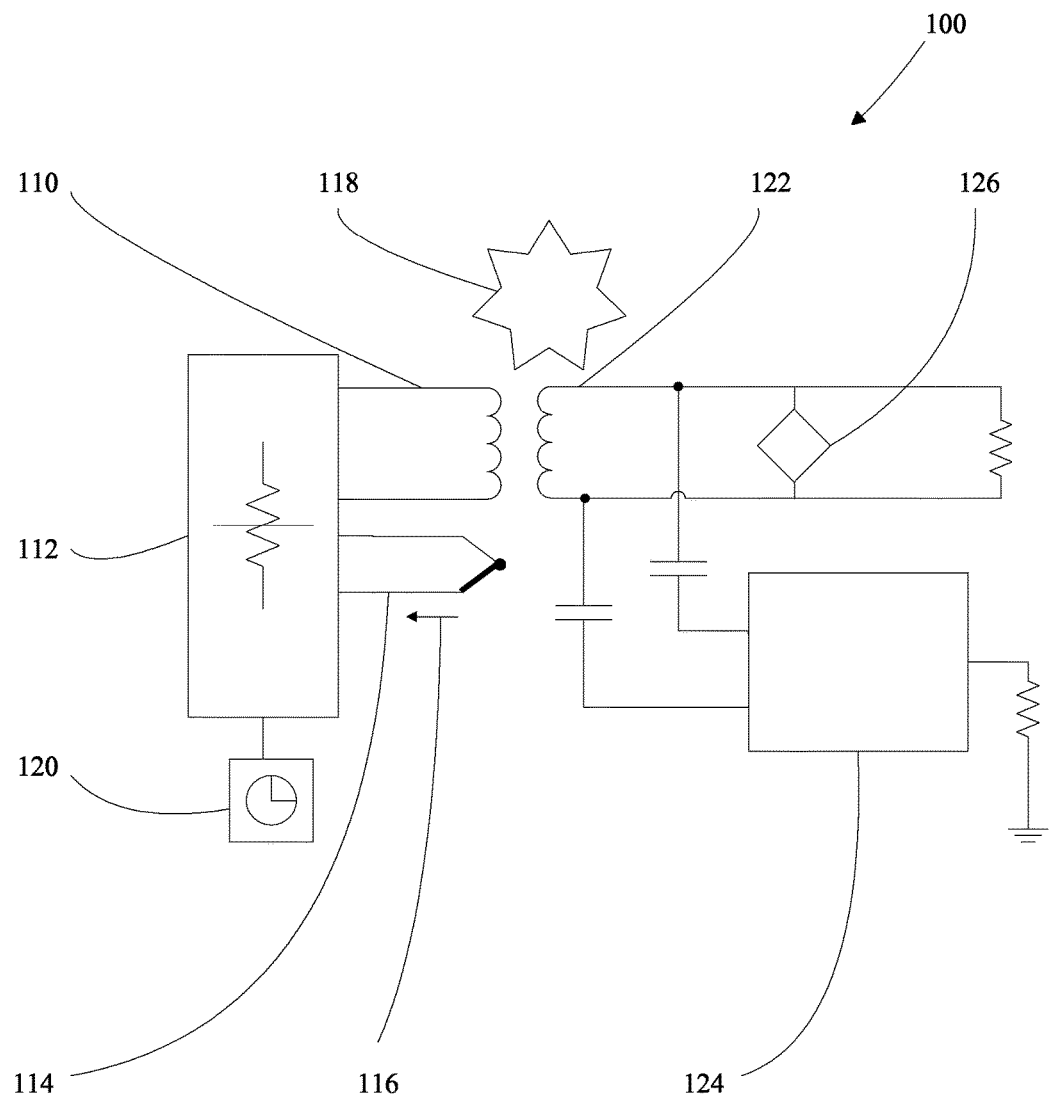
FIG. 1 show an example of a wireless power transfer foreign object detector having a temperature sensor.

FIG. 1 illustrates a wireless power transfer foreign object detector 100 that comprises at least one secondary receiver coil 110 connected to a receiving device having an adjustable load 112 electrically coupled to the at least one secondary receiver coil. At least one temperature sensor 114 provides at least one temperature detection signal 116, the at least one temperature sensor is responsive to at least one thermal state of the at least one secondary receiver coil. In this example foreign object 118 detection is based at least in part upon the at least one temperature detection signal.

The wireless power transfer foreign object detector of FIG. 1. may further comprise a timer 120 electrically coupled to the adjustable load for timing a predetermined soak period after a tuned temperature measurement, wherein the adjustable load is complex and wherein the at least one temperature sensor comprises at least one of a thermocouple, a thermopile, a thermo-diode, a thermo-transistor, an optical thermal sensor and the like.

The wireless power transfer foreign object detector of FIG. 1. may further comprise a primary transmitter coil 122 electrically coupled to a receiving device 124 and an adjustable load 126 connected to the primary transmitter coil.

Figure 2:
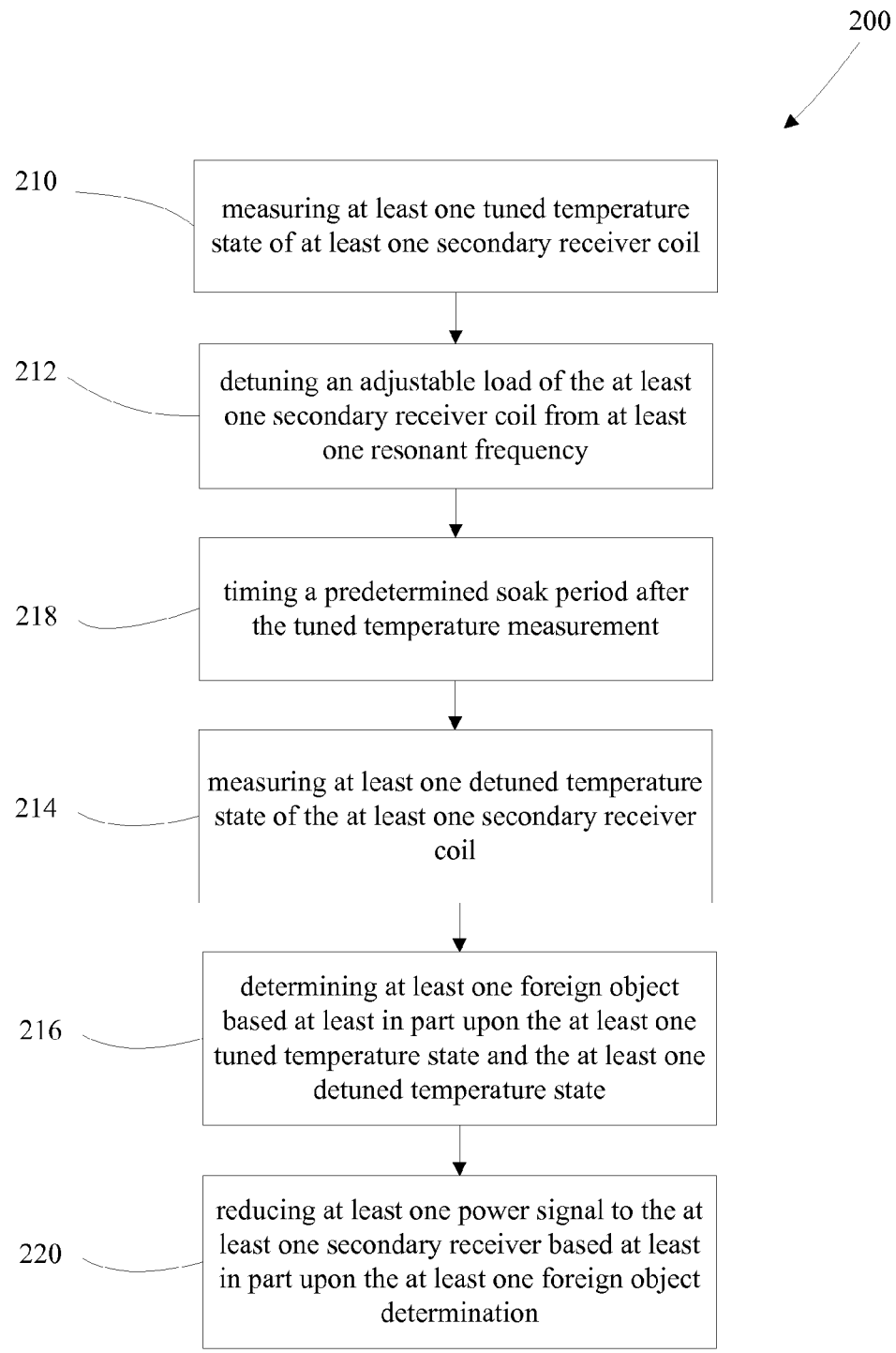
FIG. 2 shows and describes a method of wireless power transfer foreign object detection.

FIG. 2 shows and describes a method of wireless power transfer foreign object detection 200 comprising the steps of, measuring 210 at least one tuned temperature state of at least one secondary receiver coil and detuning 212 an adjustable load of the at least one secondary receiver coil from at least one resonant frequency. The method also comprises the steps of measuring 214 at least one detuned temperature state of the at least one secondary receiver coil and determining 216 at least one foreign object based at least in part upon the at least one tuned temperature state and the at least one detuned temperature state.

The method of wireless power transfer foreign object detection of FIG. 2 may further comprise the steps of, timing 218 a predetermined soak period after the tuned temperature measurement and reducing 220 at least one power signal to the at least one secondary receiver based at least in part upon the at least one foreign object determination.

Figure 3:
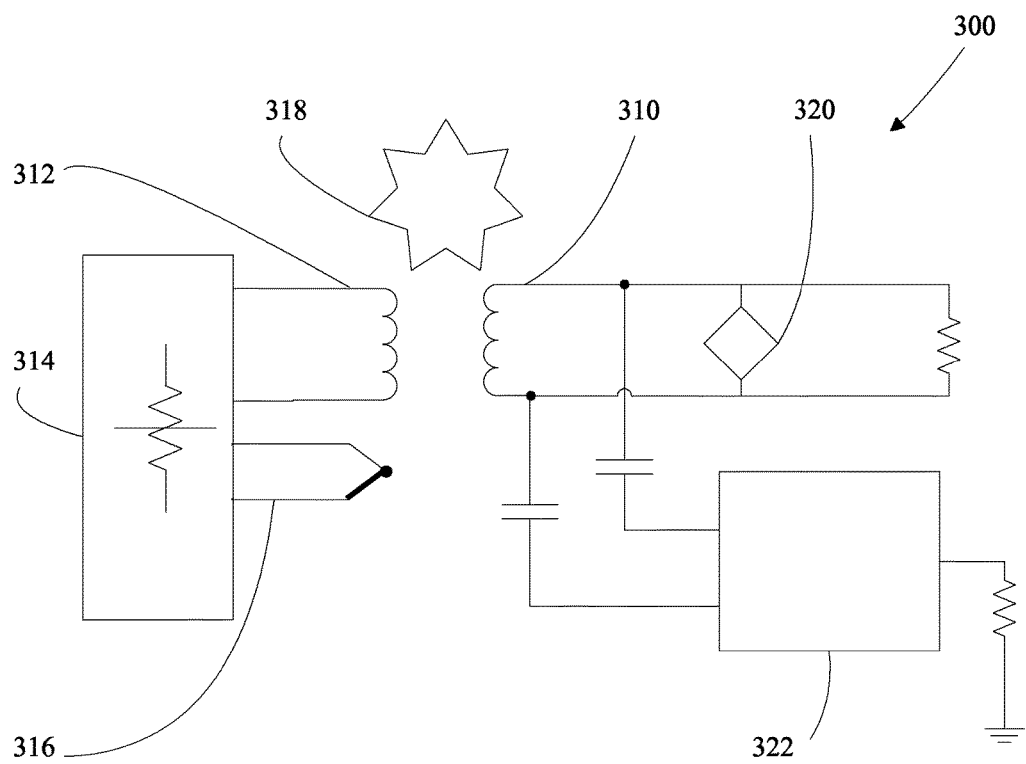
FIG. 3 shows an example of a wireless power transfer foreign object detector having a temperature sensor.

FIG. 3 shows a wireless power transfer foreign object detector 300 comprising, at least one primary transmitter coil 310 and at least one secondary receiver coil 312 responsive to the at least one primary transmitter coil. The detector additionally comprises a receiving device having an adjustable complex load 314 electrically coupled to the at least one secondary receiver coil and at least one temperature sensor 316 responsive to at least one thermal state of the at least one secondary receiver coil. Foreign object 318 detection is based at least in part upon the at least one thermal state of the at least one secondary receiver coil. The primary transmitter coil is electrically coupled to a current attenuation device 320, a receiving device 322 and an adjustable load connected to the primary transmitter coil.

The wireless power transfer foreign object detector of FIG. 3 may also have the at last one transmitted power signal transmit a substantially constant power. Additionally, the at last one transmitted power signal may decrease at a predetermined rate of decrease and the at last one transmitted power signal may transmit at a predetermined rate of increase.

Figure 4:
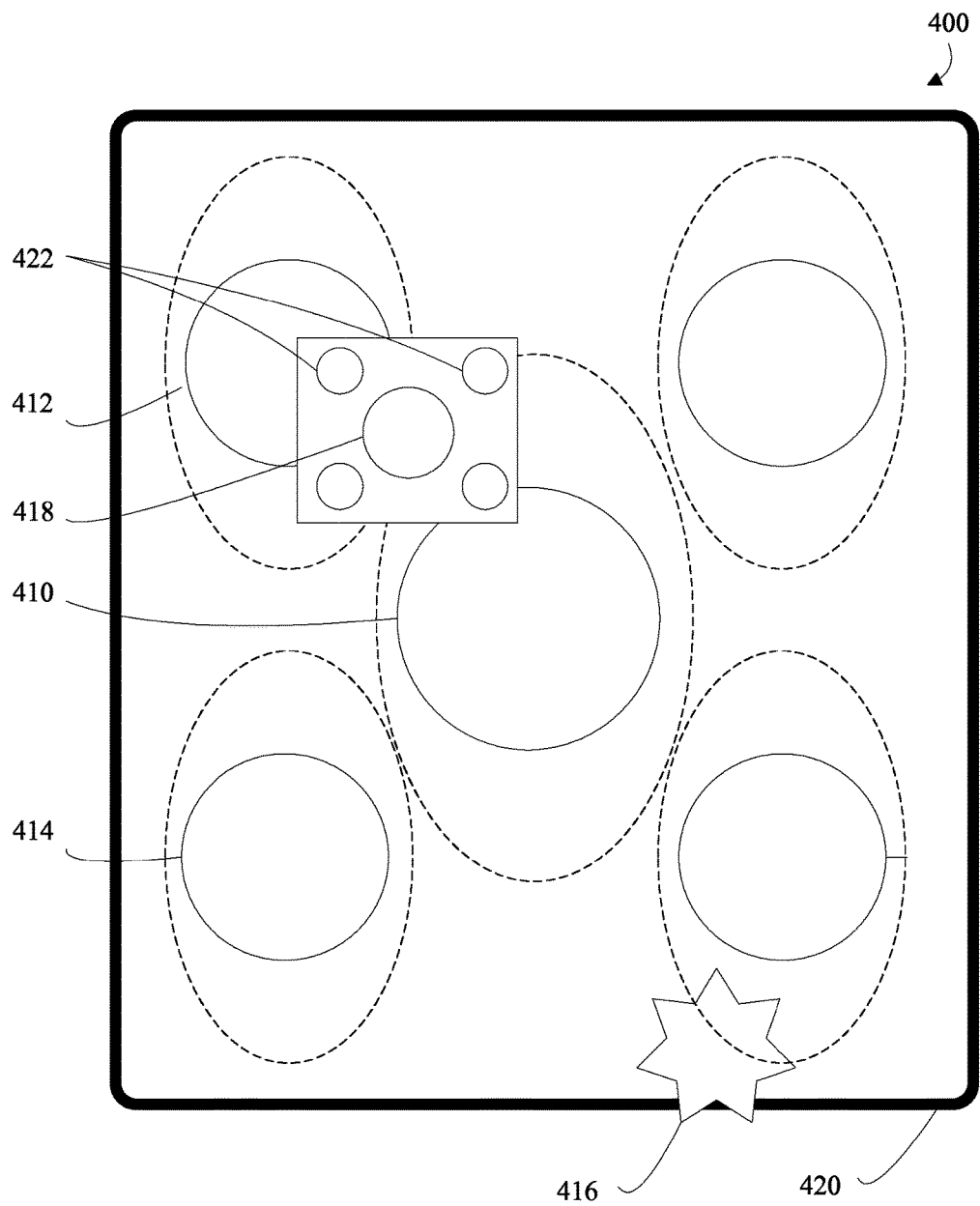
FIG. 4 shows an example of a wireless power transfer foreign object detector having multiple primary transmitter coils and multiple secondary receiver coils.

FIG. 4 shows a wireless power transfer foreign object detector 400 comprising, at least one primary transmitter coil 410 and a plurality of satellite transmitter coils 412, 414 adjacent to the at least one primary transmitter coil. Foreign object 416 detection in this example is based at least in part upon at least one characteristic of an electrical coupling of at least two of the plurality of satellite transmitter coils.

The wireless power transfer foreign object detector of FIG. 4 may further comprise, at least one secondary receiver coil 418 electrically responsive to at least one of the at least one primary transmitter coil and at least one of the plurality of satellite transmitter coils. A mat 420 may be connected to the at least one primary transmitter coil. A plurality of satellite receiver coils 422 may be adjacent to the at least one secondary receiver coil. Foreign object detection in this example is based at least in part upon at least one characteristic of an electrical coupling of the plurality of satellite receiver coils to the plurality of the satellite transmitter coils, wherein the at least one characteristic of the electrical coupling of the at least two of the plurality of satellite transmitter coils is a coupling coefficient. The at least one characteristic of the electrical coupling of the at least two of the plurality of satellite transmitter coils is power and/or the electrical coupling of the at least two of the plurality of satellite transmitter coils is a temperature.

Figure 5:
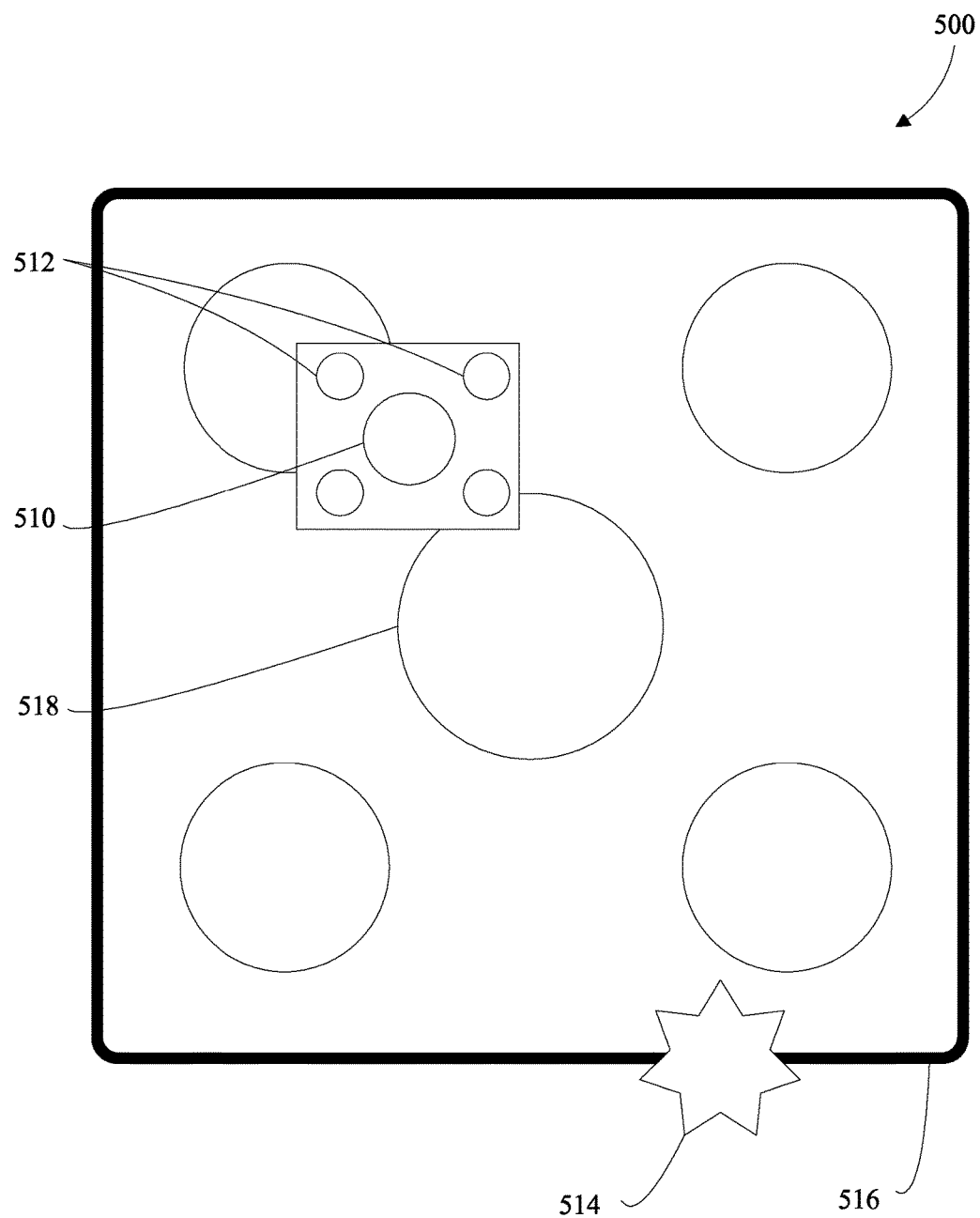
FIG. 5 shows an example of a wireless power transfer foreign object detector having multiple secondary receiver coils.

FIG. 5 shows a wireless power transfer foreign object detector 500 comprising, at least one secondary receiver coil 510 and a plurality of satellite receiver coils 512 adjacent to the at least one secondary receiver coil. Foreign object 514 detection in this example is based at least in part upon at least one characteristic of an electrical coupling of at least two of the plurality of satellite receiver coils. The primary transmitter coils may be connected to a mat 516.

The wireless power transfer foreign object detector of FIG. 5 may further comprise, at least one primary transmitter coil 518 electrically responsive to at least one of the at least one secondary receiver coil and at least one of the plurality of satellite receiver coils.

Figure 6:
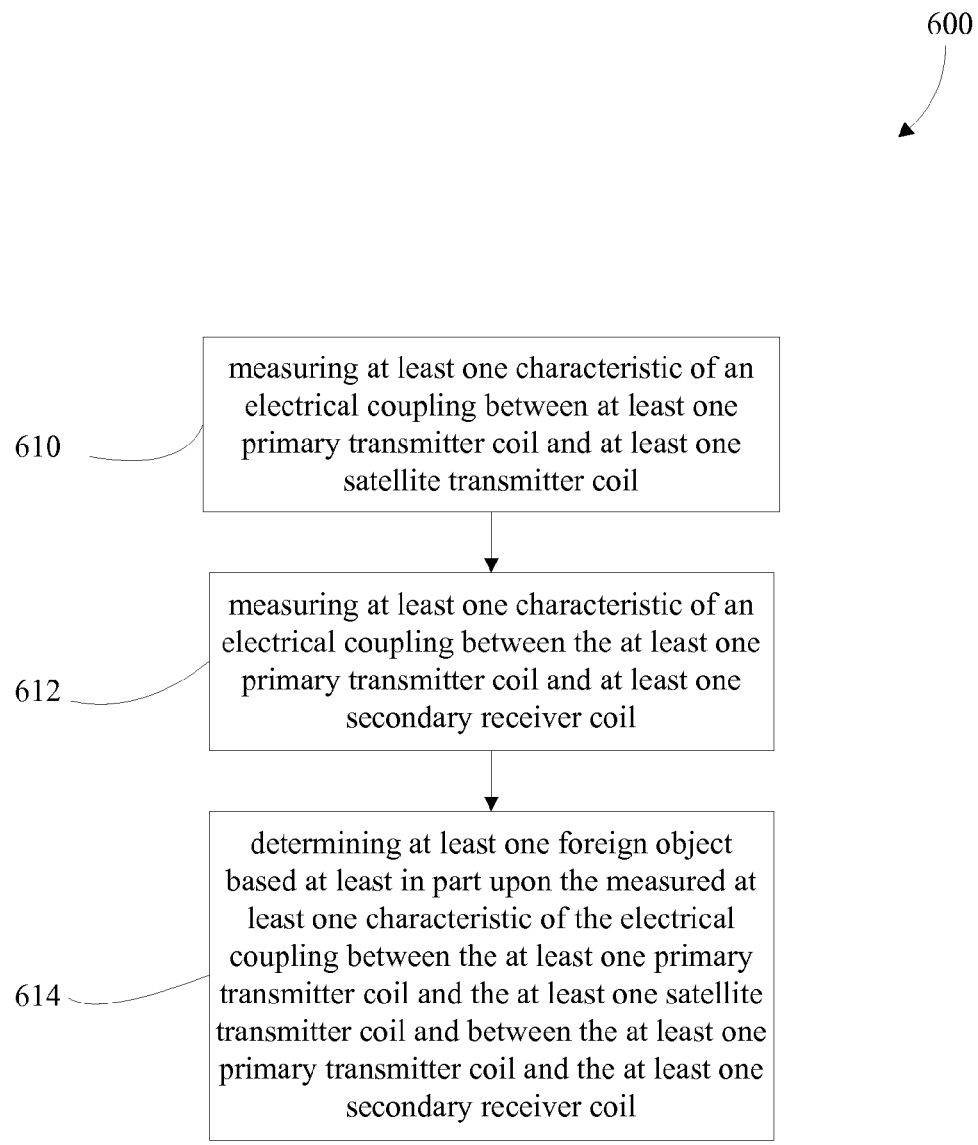
FIG. 6 shows and describes a method of wireless power transfer foreign object detection based at least in part upon electrical coupling characteristics.

FIG. 6 shows and describes a method of wireless power transfer foreign object detection 600 comprising the steps of, measuring 610 at least one characteristic of an electrical coupling between at least one primary transmitter coil and at least one satellite transmitter coil and measuring 612 at least one characteristic of an electrical coupling between the at least one primary transmitter coil and at least one secondary receiver coil. The method further comprises determining 614 at least one foreign object based at least in part upon the measured at least one characteristic of the electrical coupling between the at least one primary transmitter coil and the at least one satellite transmitter coil and between the at least one primary transmitter coil and the at least one secondary receiver coil.

Figure 7:
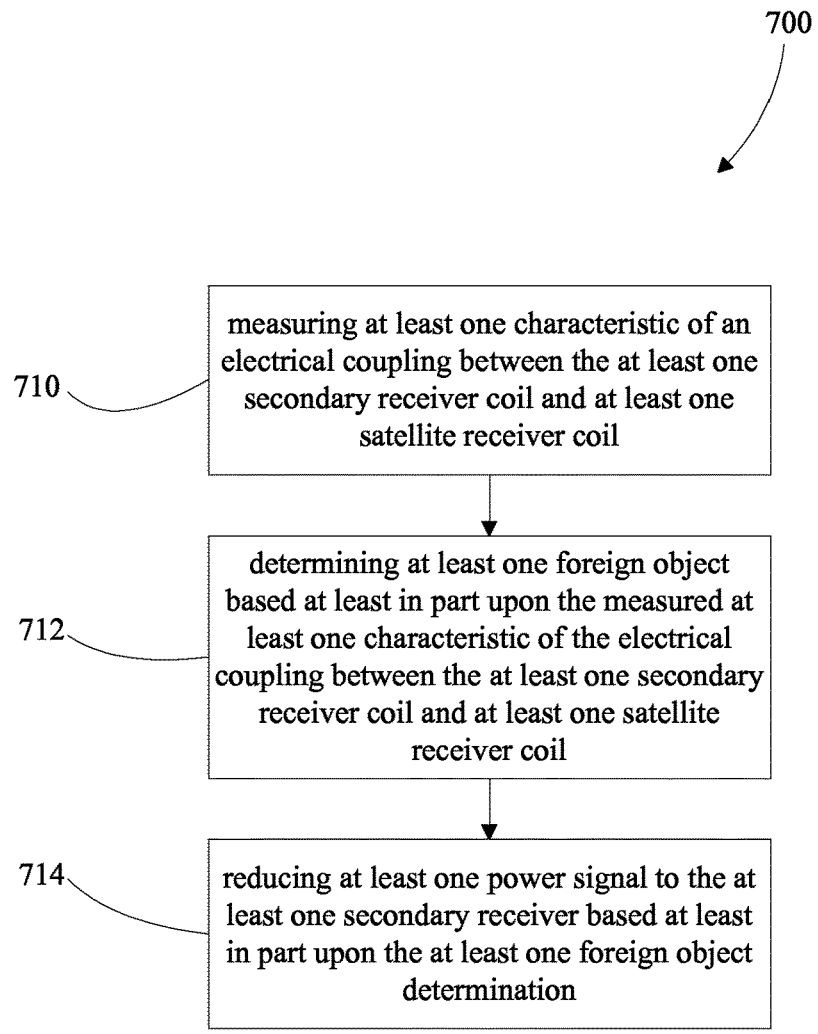
FIG. 7 shows and describes a method of wireless power transfer foreign object detection based at least in part upon electrical coupling characteristics.

The method of wireless power transfer foreign object detection 700 of FIG. 7 may further comprise the steps of, measuring 710 at least one characteristic of an electrical coupling between the at least one secondary receiver coil and at least one satellite receiver coil and determining 712 at least one foreign object based at least in part upon the measured at least one characteristic of the electrical coupling between the at least one secondary receiver coil and at least one satellite receiver coil. The method may also comprise the step of reducing 714 a power transmitted signal to the at least one primary transmitter coil based at least in part upon the determined at least one foreign object and generating a fault flag based at least in part upon the determined at least one foreign object.

Figure 8:
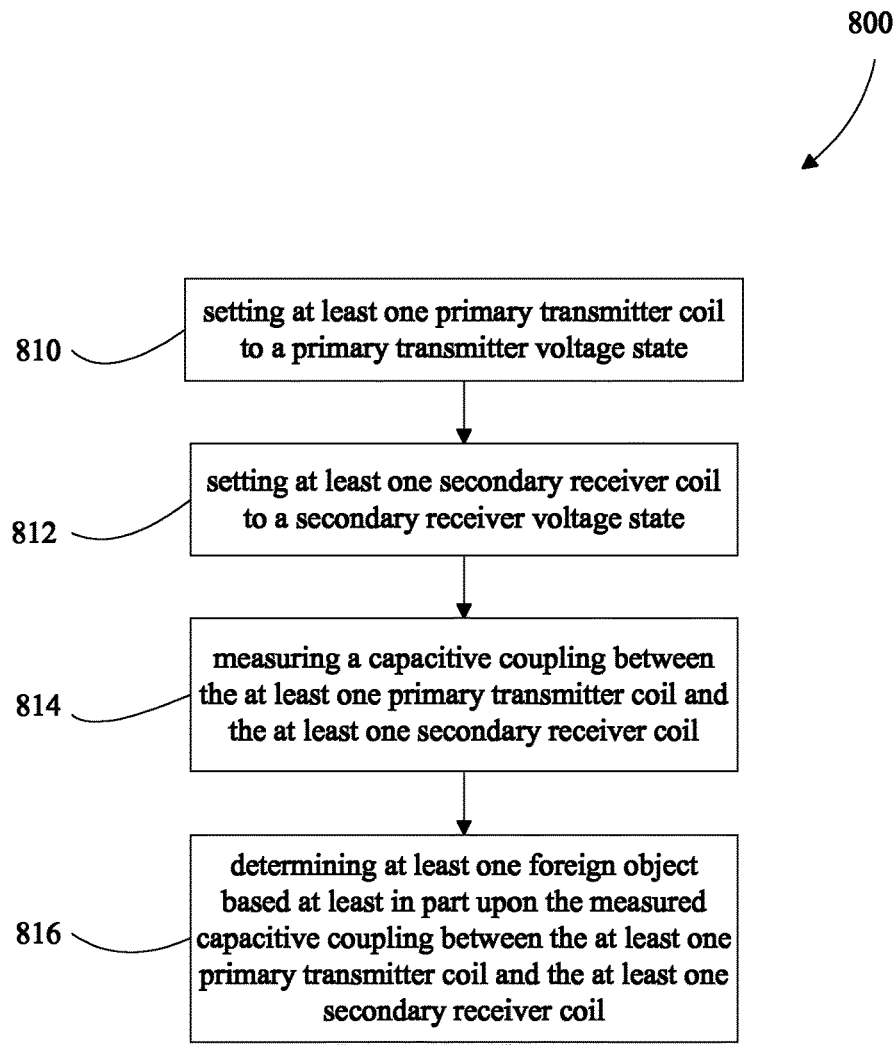
FIG. 8 shows and describes a method of wireless power transfer foreign object detection based at least in part upon capacitive coupling characteristics.

FIG. 8 shows a method of wireless power transfer foreign object detection 800 comprising the steps of setting 810 at least one primary transmitter coil to a primary transmitter voltage state and setting 812 at least one secondary receiver coil to a secondary receiver voltage state. The method further comprises the steps of measuring 814 a capacitive coupling between the at least one primary transmitter coil and the at least one secondary receiver coil and determining 816 at least one foreign object based at least in part upon the measured capacitive coupling between the at least one primary transmitter coil and the at least one secondary receiver coil.

Figure 9:
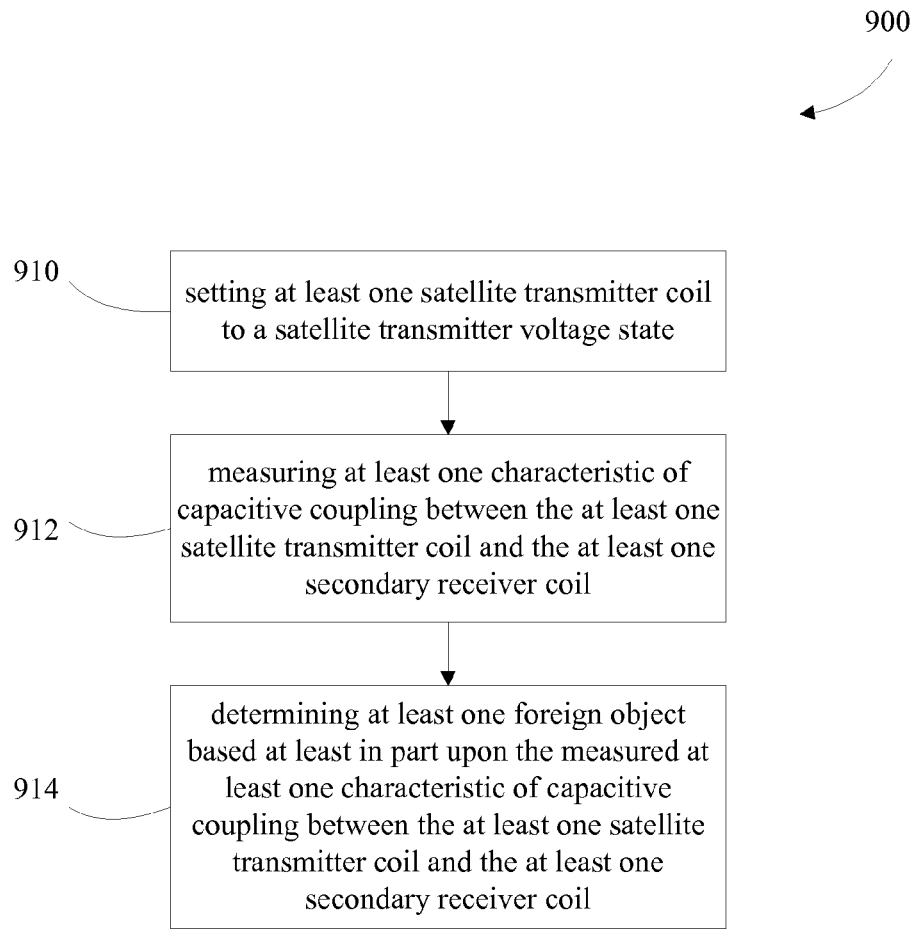
FIG. 9 shows and describes a method of wireless power transfer foreign object detection based at least in part upon capacitive coupling characteristics.

The method of wireless power transfer foreign object detection 900 of FIG. 9 may further comprise the steps of, setting 910 at least one satellite transmitter coil to a satellite transmitter voltage state and measuring 912 at least one characteristic of capacitive coupling between the at least one satellite transmitter coil and the at least one secondary receiver coil. The method may further comprise the step of determining 914 at least one foreign object based at least in part upon the measured at least one characteristic of capacitive coupling between the at least one satellite transmitter coil and the at least one secondary receiver coil.

Figure 10:
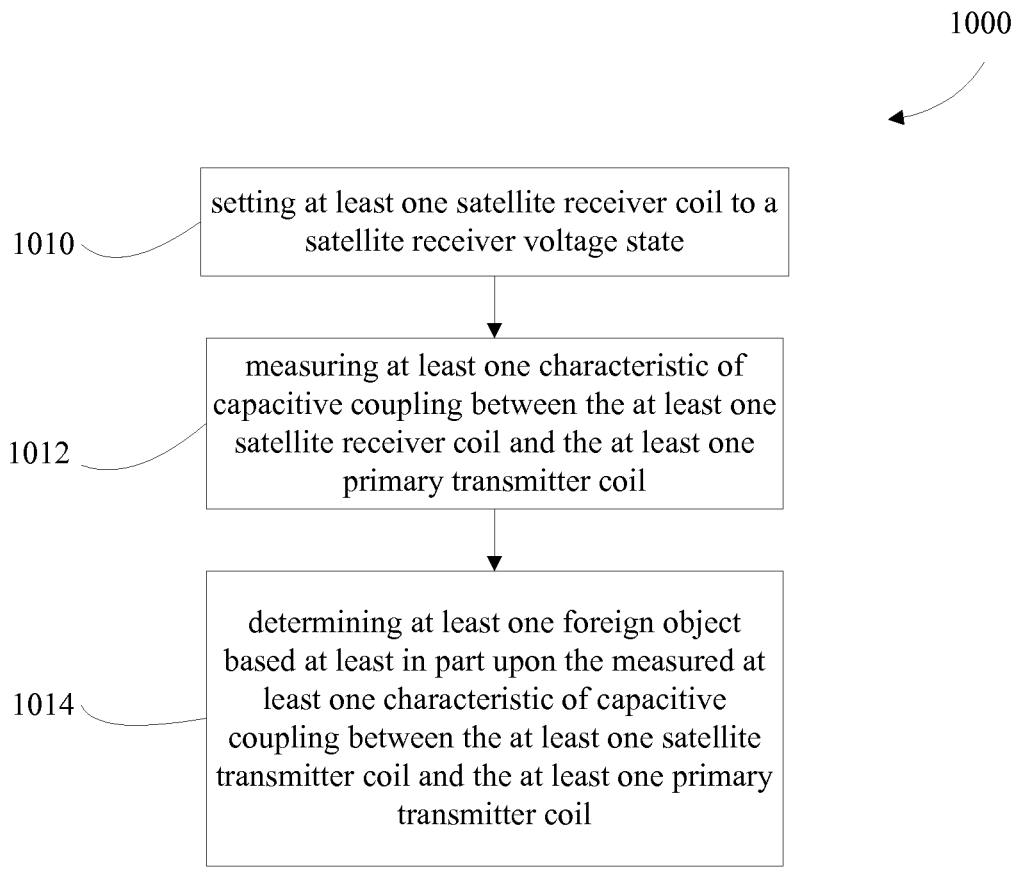
FIG. 10 shows and describes a method of wireless power transfer foreign object detection based at least in part upon capacitive coupling characteristics.

The method of wireless power transfer foreign object detection 1000 of FIG. 10 may further comprise the steps of, setting 1010 at least one satellite receiver coil to a satellite receiver voltage state and measuring 1012 at least one characteristic of capacitive coupling between the at least one satellite receiver coil and the at least one primary transmitter coil. The method may further comprise the step of determining 1014 at least one foreign object based at least in part upon the measured at least one characteristic of capacitive coupling between the at least one satellite transmitter coil and the at least one primary transmitter coil.

Figure 11:
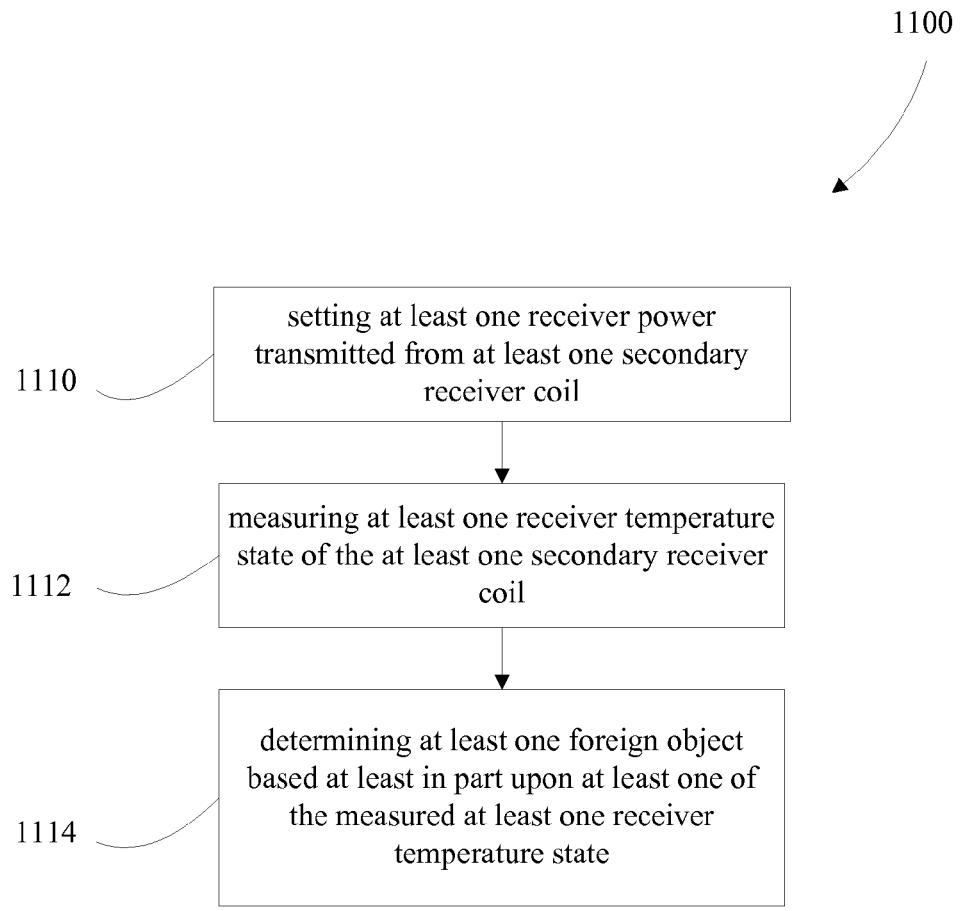
FIG. 11 shows and describes a method of wireless power transfer foreign object detection based at least in part upon temperature characteristics.

FIG. 11 shows a method of wireless power transfer foreign object detection 1100 comprising the steps of, setting 1110 at least one receiver power transmitted from at least one secondary receiver coil, measuring 1112 at least one receiver temperature state of the at least one secondary receiver coil and determining 1114 at least one foreign object based at least in part upon at least one of the measured at least one receiver temperature state.

Figure 12:
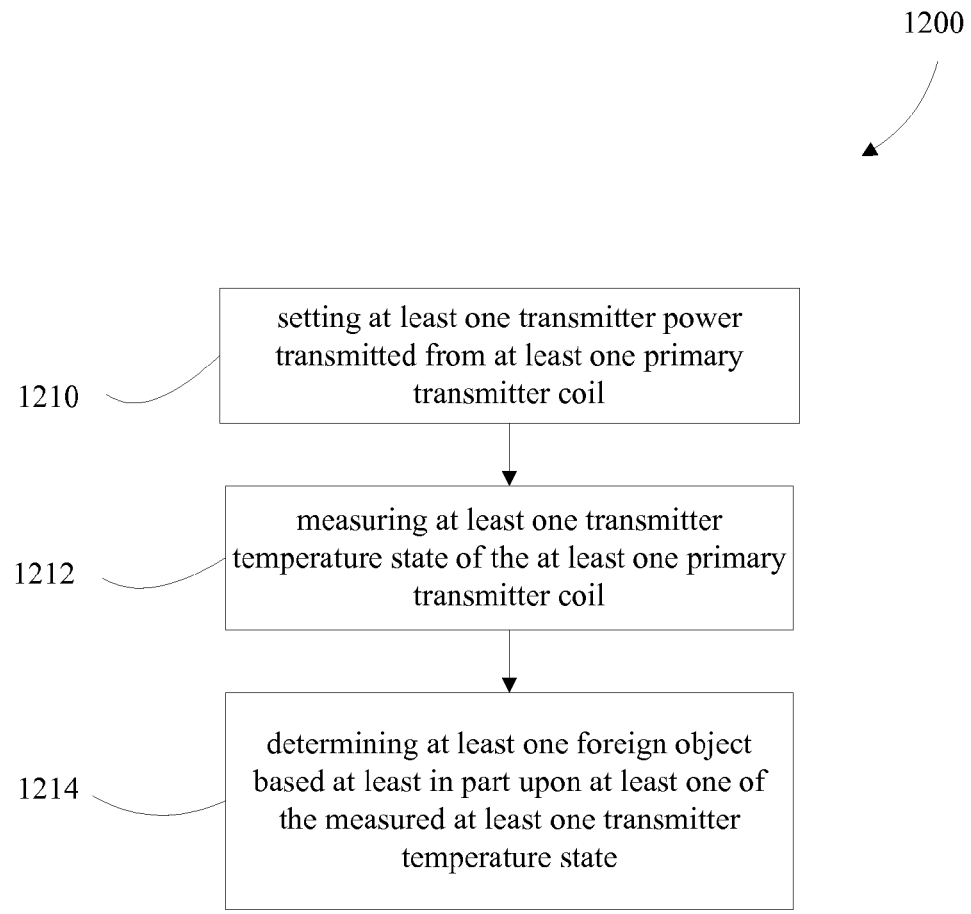
FIG. 12 shows and describes a method of wireless power transfer foreign object detection based at least in part upon temperature characteristics.

The method of wireless power transfer foreign object detection 1200 of FIG. 12 may further comprise the steps of, setting 1210 at least one transmitter power transmitted from at least one primary transmitter coil, measuring 1212 at least one transmitter temperature state of the at least one primary transmitter coil, and determining 1214 at least one foreign object based at least in part upon at least one of the measured at least one transmitter temperature state.

Figure 13:
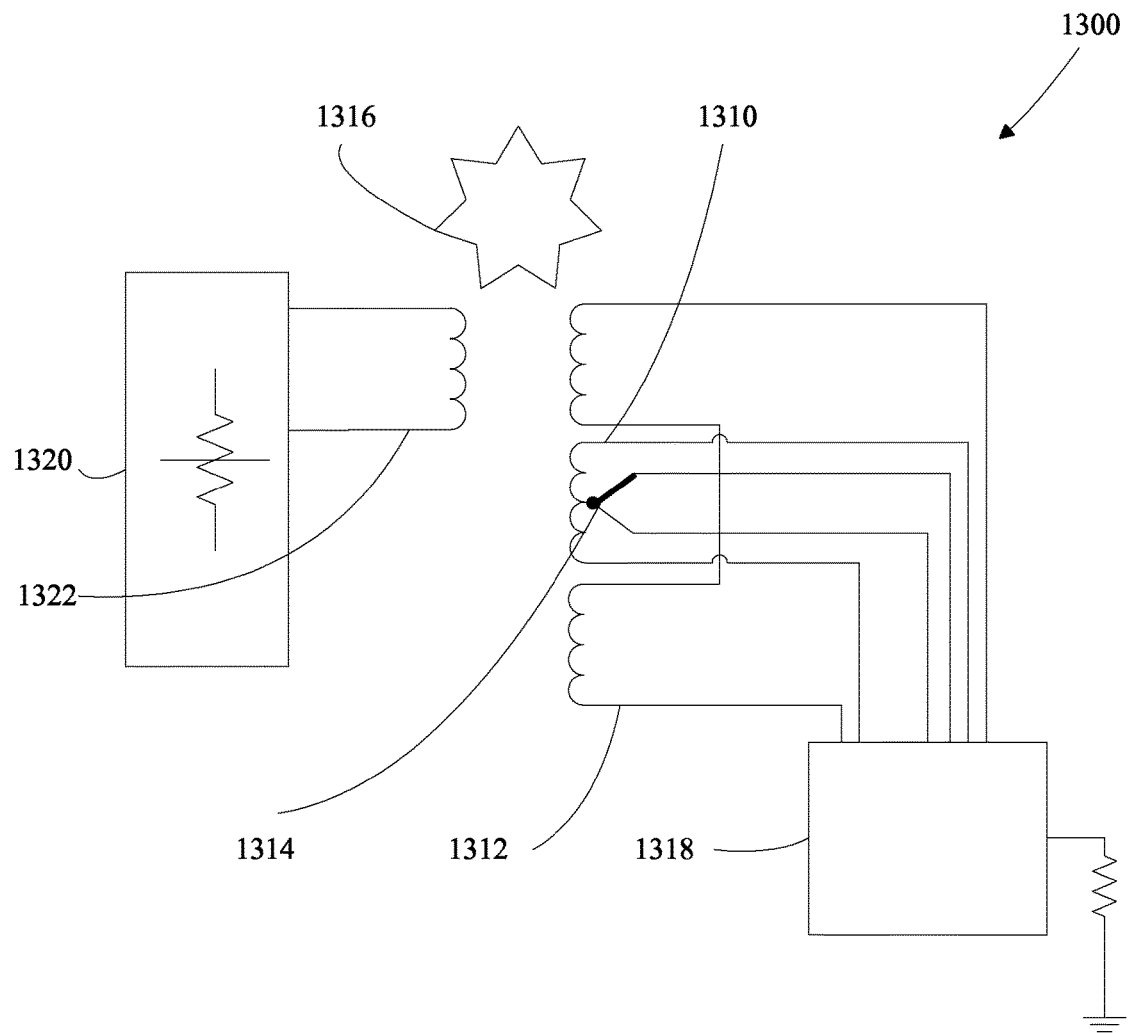
FIG. 13 shows an example of a wireless power transfer foreign object detector having multiple primary transmitter coils and wherein foreign object detection is based at least in part upon a temperature sensor.

FIG. 13 shows a wireless power transfer foreign object detector 1300 comprising, at least one inner primary transmitter coil 1310 and at least one outer primary transmitter coil 1312, wherein the outer primary transmitter coil adjacent to the at least one inner primary transmitter coil. At least one temperature sensor 1314 provides at least one transmitter temperature detection signal, wherein the at least one temperature sensor responsive to at least one thermal state of the at least one inner primary transmitter coil and at least one outer primary transmitter coil. Foreign object 1316 detection in this example is based at least in part upon the at least one transmitter temperature detection signal. The primary transmitter coil is electrically connected to a transmitting device 1318 and a receiving device having a variable load 1320 is electrically connected to a secondary receiver coil 1322.

Figure 14:
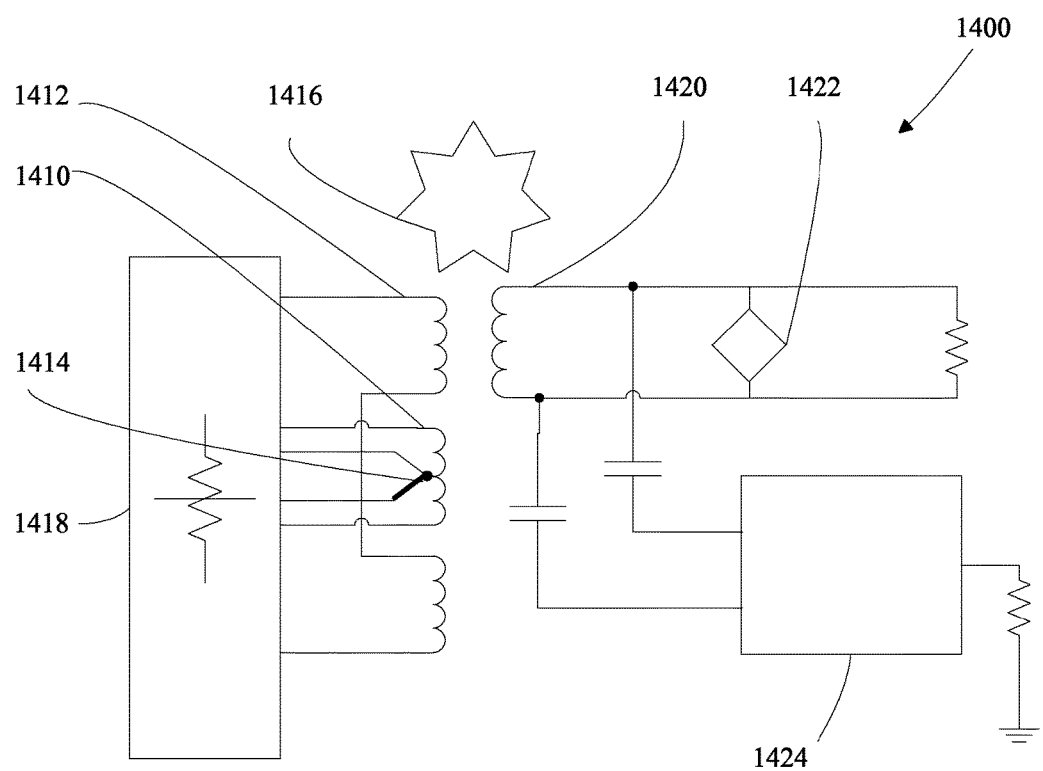
FIG. 14 shows an example of a wireless power transfer foreign object detector having multiple secondary receiver coils and wherein foreign object detection is based at least in part upon a temperature sensor.

FIG. 14 shows a wireless power transfer foreign object detector 1400 comprising, at least one inner secondary receiver coil 1410, at least one outer secondary receiver coil 1412 where the outer secondary receiver coil is adjacent to the at least one secondary receiver coil. At least one temperature sensor 1414 provides at least one receiver temperature detection signal, the at least one temperature sensor responsive to at least one thermal state of the at least one inner secondary receiver coil and at least one outer secondary receiver coil. Foreign object 1416 detection in this example is based at least in part upon the at least one receiver temperature detection signal.

A receiving device has a variable load 1418 that is electrically connected to the at least one inner secondary receiver coil and the at least one outer secondary receiver coil. A primary transmitter coil 1420 is electrically connected to a variable load 1422 and a transmitting device 1424.

Figure 15:
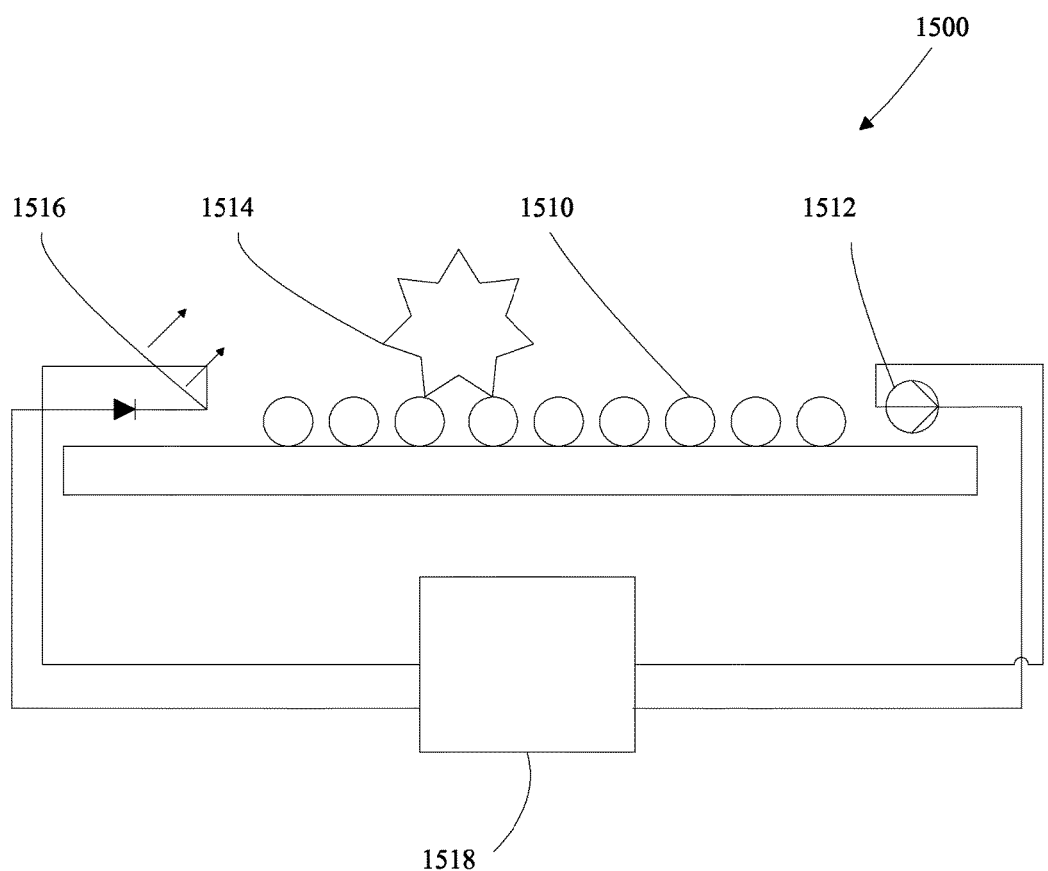
FIG. 15 shows an example of a wireless power transfer foreign object detector having magnetically movable particles and an optical sensor.

FIG. 15 shows a wireless power transfer foreign object detector 1500 comprising, at plurality of mobile ferrites 1510 and at least one optical detector 1512 optically responsive to the plurality of mobile ferrites. The at least one optical detector provides an optical detection signal. Foreign object 1514 detection is based at least in part upon the optical detection signal. The at least one optical detector is responsive to a luminescent source 1516. A transmitting device 1518 is electrically coupled to the luminescent source and the at least one optical detector.

Figure 16:
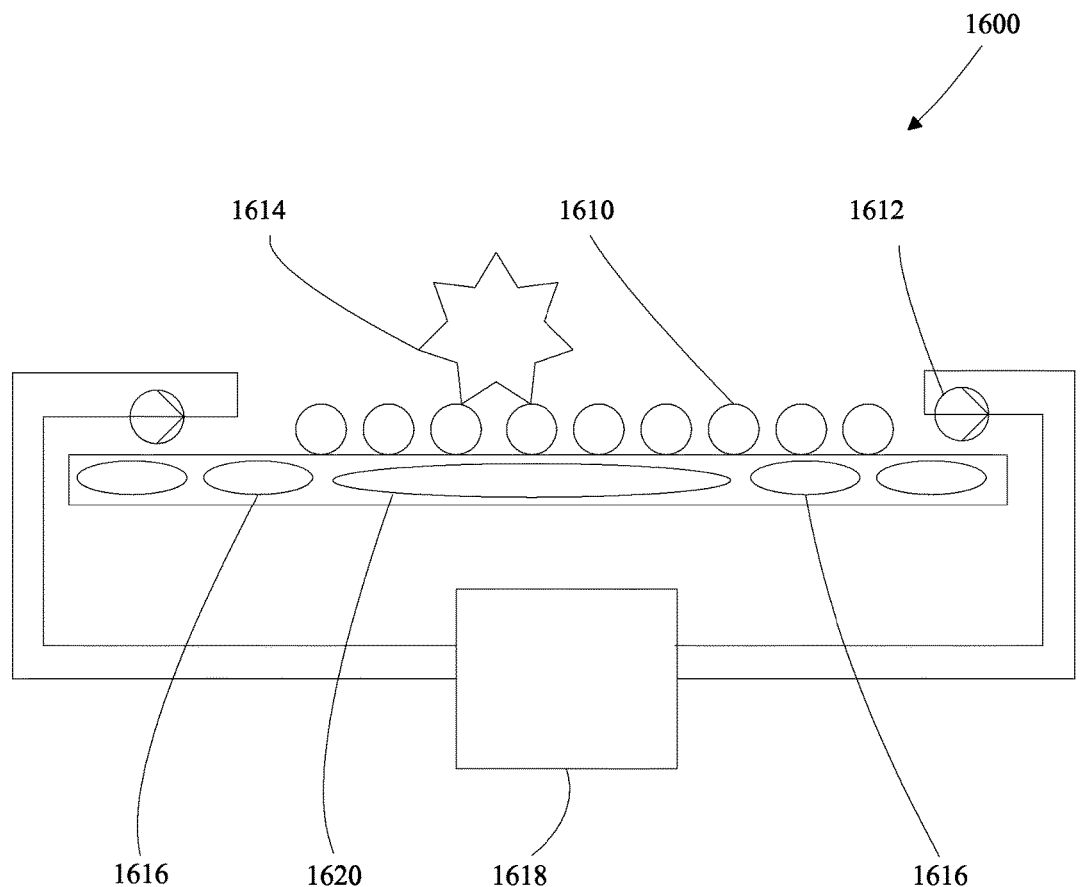
FIG. 16 shows an example of a wireless power transfer foreign object detector having magnetically movable particles.

FIG. 16 shows a wireless power transfer foreign object detector 1600 that comprises multiple mobile ferrites 1610 and at least one magnetic detector 1612 is responsive to the mobile ferrites. The at least one magnetic detector provides a magnetic detection signal. Foreign object 1614 detection in this example is based at least in part upon the magnetic detection signal. At least one mobile ferrite sweeper 1616 locationally directs at least one of said plurality of mobile ferrites based at least in part upon said foreign object detection signal. A transmitting device 1618 is electrically coupled to the at least one magnetic detector and the mobile ferrite sweeper. The at least one magnetic detector may be responsive to at least one of a primary transmitter coil 1620 and a secondary receiver coil and the at least one mobile ferrite sweeper may be responsive to at least one of the primary transmitter coil and the secondary receiver coil.

Figure 17:
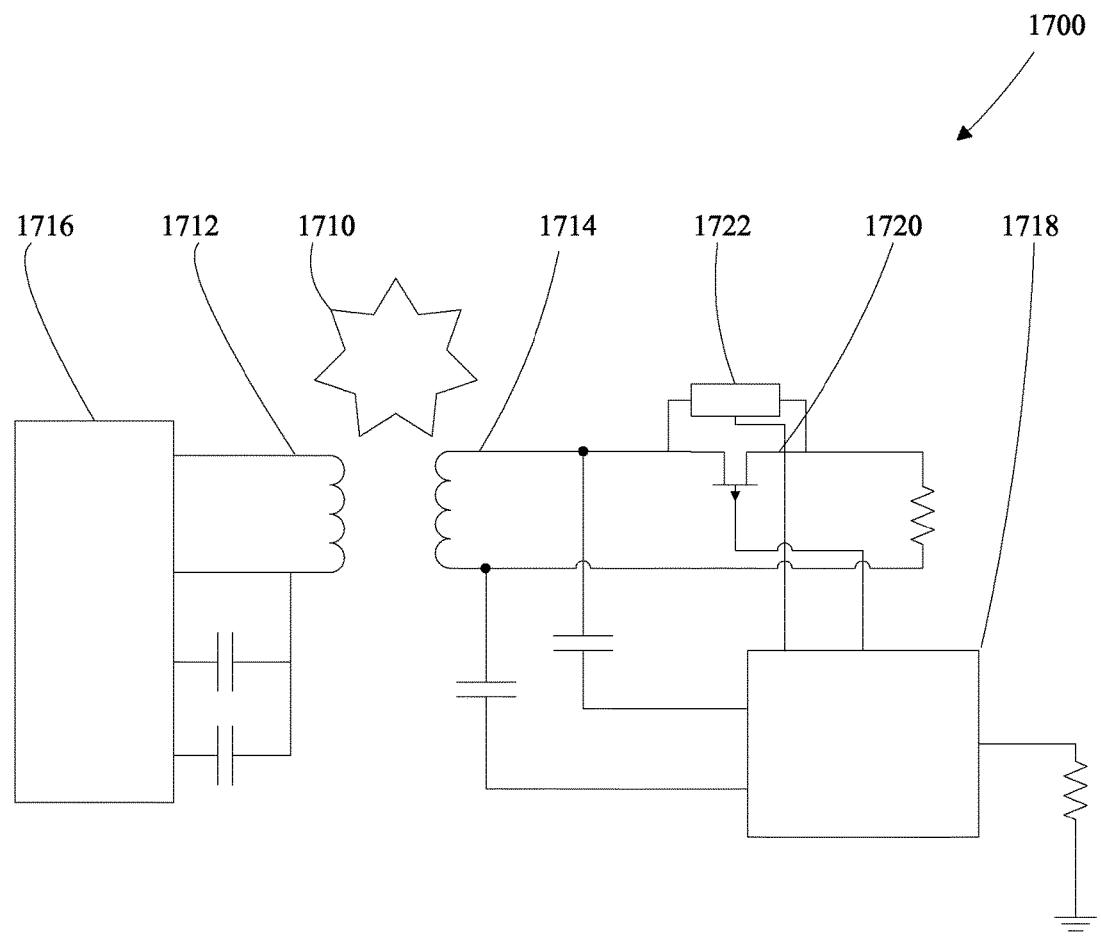
FIG. 17 shows an example of a wireless power transfer foreign object detector having primary transmitter coil power modulated by a transistor.

FIG. 17 shows a wireless power transfer foreign object detector 1700 that detects foreign objects 1710 that comprises a secondary receiver coil 1712 magnetically coupled to a primary transmitter coil 1714. The secondary receiver coil is electrically connected to a receiving device 1716. A transmitting device 1718 is electrically connected to the primary transmitter coil. A load is varied through the use of a transistor 1720 that has a feedback portion 1722.

Figure 18:
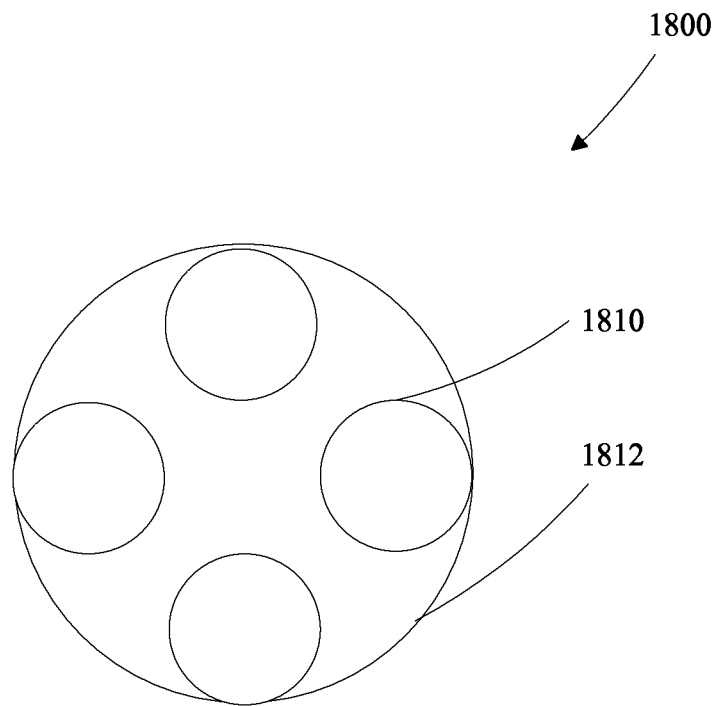
FIG. 18 shows a wireless power transfer foreign object detector having multiple primary transmitter coils.

FIG. 18 shows a wireless power transfer foreign object detector 1800 that comprises at least one outer coil 1812 and at least one inner coil 1810.

Figure 19:
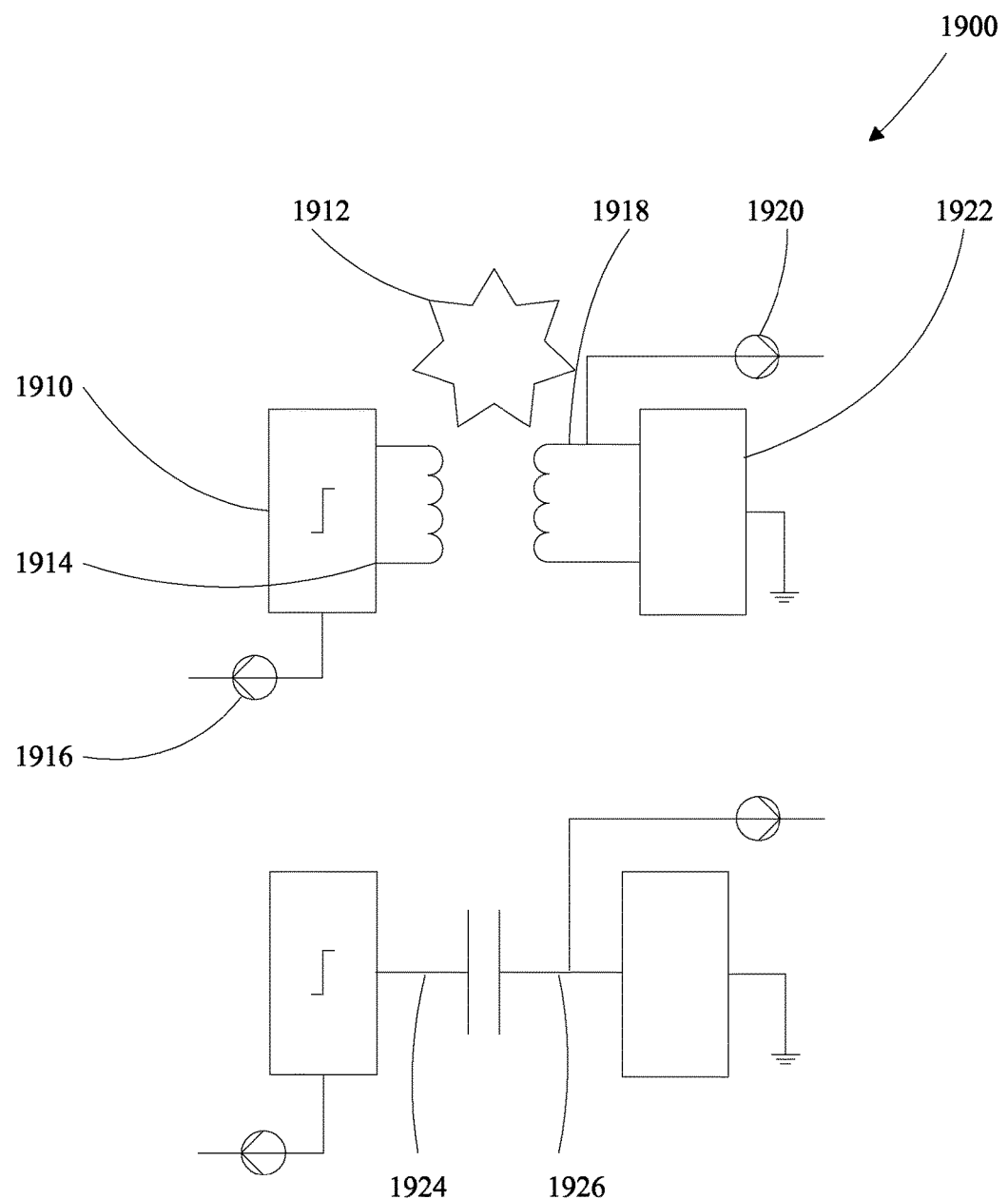
FIG. 19 shows a wireless power transfer foreign object detector wherein coil capacitance characteristics are measured.

FIG. 19 shows a wireless power transfer foreign object detector 1900 that comprises a varying load connected to a receiving device 1910 that may detect a foreign object 1912, the receiving device that is electrically connected to at least one secondary receiver coil 1914. The receiving device has a transducer 1916 that measures at least one characteristic of magnetic coupling of the secondary receiver coil. At least one primary transmitter coil 1918 is electrically connected a transducer 1920 and to a transmitting device 1922. In this example the secondary receiver coil is treated as a first plate 1924 of a capacitor and the primary receiver coil is treated as a second plate 1926 of the capacitor. Magnetic coupling is then measured by the apparent capacitance between the primary transmitter coil and the secondary receiver coil.

Figure 20:
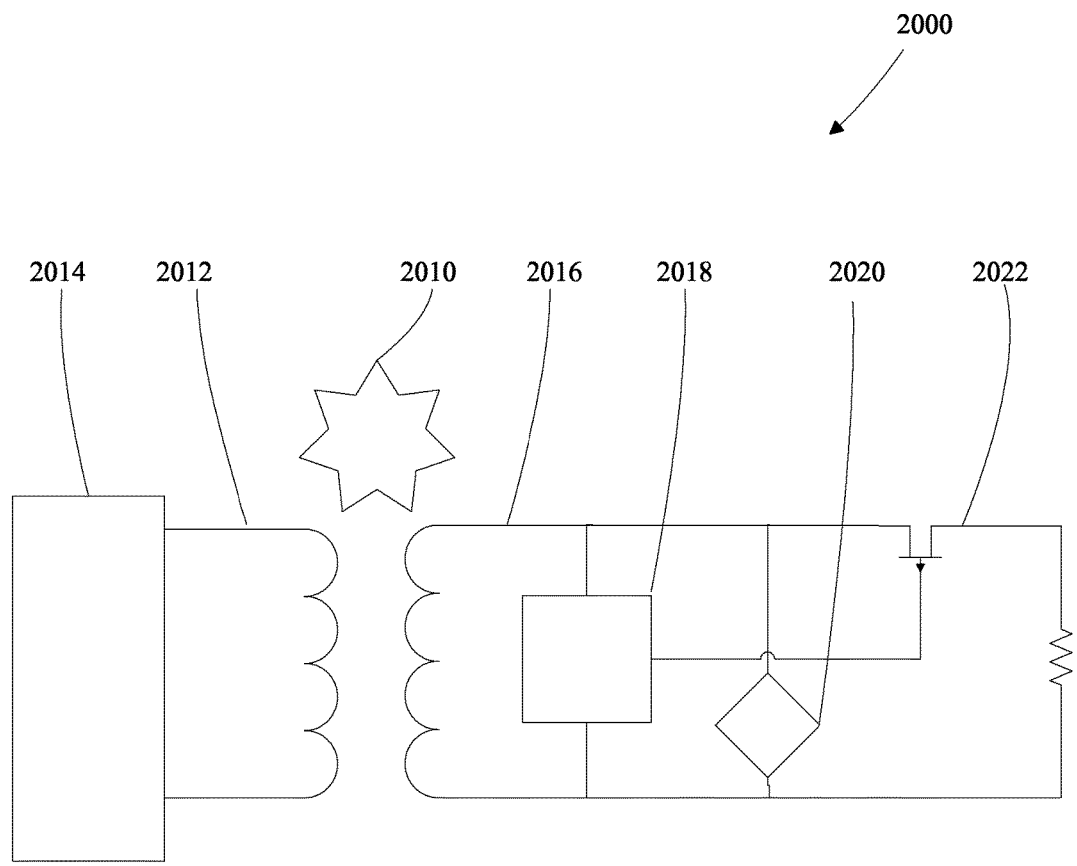
FIG. 20 shows a wireless power transfer foreign object detector.

FIG. 20 shows a wireless power transfer foreign object detector 2000 that detects foreign objects 2010 that comprises at least one secondary receiver coil 2012 electrically connected to a receiving device 2014. At least one primary transmitter coil 2016 is electrically connected to a transmitting device 2018 that monitors at least one characteristic of a coupling magnetic field via a transducer 2020. Feedback is provided to a transistor 2022 to modulate the coupling magnetic field.

While the making and using of various exemplary examples of the disclosure are discussed herein, it is to be appreciated that the present disclosure provides concepts which can be described in a wide variety of specific contexts. Although the disclosure has been shown and described with respect to a certain example, it is obvious that equivalents and modifications will occur to others skilled in the art upon the reading and understanding of the specification. The present disclosure includes such equivalents and modifications, and is limited only by the scope of the following claims.

It is to be understood that the device and method may be practiced with coupled inductor systems having communications and power transfer functionality, such as for example, battery chargers, AC/DC converters, power supplies, and associated apparatus. For purposes of clarity, detailed descriptions of functions, components, and systems familiar to those skilled in the applicable arts are not included. The methods and apparatus of the disclosure provide one or more advantages including which are not limited to, data transfer capabilities, managed power transfer capabilities, and enhanced energy utilization and conservation attributes. While the disclosure has been described with reference to certain illustrative examples, those described herein are not intended to be construed in a limiting sense. For example, variations or combinations of steps or materials in the examples shown and described may be used in particular cases while not departing from the disclosure. Various modifications and combinations of the illustrative examples as well as other advantages and examples will be apparent to persons skilled in the arts upon reference to the drawings, description, and claims.

What is claimed is:

1. A method of wireless power transfer foreign object detection comprising:
   measuring at least one tuned state of at least one secondary receiver coil;
   detuning an adjustable load of the at least one secondary receiver coil from at least one resonant frequency;
   measuring at least one detuned state of the at least one secondary receiver coil; and
   determining at least one foreign object based at least in part upon the at least one tuned state and the at least one detuned state.

2. The method of wireless power transfer foreign object detection according to claim 1 further comprising timing a predetermined period after the tuned state measurement.

3. The method of wireless power transfer foreign object detection according to claim 1 further comprising reducing at least one power signal to the at least one secondary receiver coil based at least in part upon the at least one foreign object determination.

4. A wireless power transfer foreign object detector comprising:
   at least one primary transmitter coil;
   one or more satellite transmitter coils adjacent to the at least one primary transmitter coil; and
   wherein foreign object detection is based at least in part upon at least one characteristic of an electrical coupling of at least one of the one or more satellite transmitter coils.

5. The wireless power transfer foreign object detector according to claim 4 further comprising at least one secondary receiver coil electrically responsive to at least one of the at least one primary transmitter coil and at least one of the one or more satellite transmitter coils.

6. The wireless power transfer foreign object detector according to claim 4 further comprising at least one secondary receiver coil.

7. The wireless power transfer foreign object detector according to claim 4 further comprising:
   at least one secondary receiver coil; and
   a plurality of satellite receiver coils adjacent to the at least one secondary receiver coil.

8. The wireless power transfer foreign object detector according to claim 4 wherein the at least one characteristic of the electrical coupling of the at least two of the one or more satellite transmitter coils is a coupling coefficient.

9. The wireless power transfer foreign object detector according to claim 4 wherein the at least one characteristic of the electrical coupling of the at least two of the one or more satellite transmitter coils is power.

10. The wireless power transfer foreign object detector according to claim 4 wherein the at least one characteristic of the electrical coupling of the at least two of the one or more satellite transmitter coils is a temperature.

11. A method of wireless power transfer foreign object detection comprising:
    measuring at least one characteristic of an electrical coupling between at least one primary transmitter coil and at least one satellite transmitter coil;
    measuring at least one characteristic of an electrical coupling between the at least one primary transmitter coil and at least one secondary receiver coil; and
    determining at least one foreign object based at least in part upon the measured at least one characteristic of the electrical coupling between the at least one primary transmitter coil and the at least one satellite transmitter coil and between the at least one primary transmitter coil and the at least one secondary receiver coil.

12. The method of wireless power transfer foreign object detection according to claim 11 further comprising measuring at least one characteristic of an electrical coupling between the at least one secondary receiver coil and at least one satellite receiver coil.

13. The method of wireless power transfer foreign object detection according to claim 12 further comprising determining at least one foreign object based at least in part upon the measured at least one characteristic of the electrical coupling between the at least one secondary receiver coil and at least one satellite receiver coil.

14. The method of wireless power transfer foreign object detection according to claim 11 further comprising reducing a power transmitted signal to the at least one primary transmitter coil based at least in part upon the determined at least one foreign object.

15. The method of wireless power transfer foreign object detection according to claim 11 further comprising generating a fault flag based at least in part upon the determined at least one foreign object.

16. A method of wireless power transfer foreign object detection comprising:
   setting at least one primary transmitter coil to a primary transmitter voltage state;
   setting at least one secondary receiver coil to a secondary receiver voltage state;
   measuring a capacitive coupling between the at least one primary transmitter coil and the at least one secondary receiver coil; and
   determining at least one foreign object based at least in part upon the measured capacitive coupling between the at least one primary transmitter coil and the at least one secondary receiver coil.

17. The method of wireless power transfer foreign object detection according to claim 16 further comprising setting at least one satellite transmitter coil to a satellite transmitter voltage state.

18. The method of wireless power transfer foreign object detection according to claim 17 further comprising measuring at least one characteristic of capacitive coupling between the at least one satellite transmitter coil and the at least one secondary receiver coil.

19. The method of wireless power transfer foreign object detection according to claim 18 further comprising determining at least one foreign object based at least in part upon the measured at least one characteristic of capacitive coupling between the at least one satellite transmitter coil and the at least one secondary receiver coil.

20. The method of wireless power transfer foreign object detection according to claim 16 further comprising setting at least one satellite receiver coil to a satellite receiver voltage state.

\* \* \* \* \*